3,305,369
METHOD OF PRODUCTION OF AQUEOUS SILVER SUSPENSIONS APPLIED FOR ONLY ONE STOVING OPERATION
Bohuslav Cuhra and Karel Grüner, both of Prague, Czechoslovakia, assignors to Tesla, narodni podnik, Prague, Czechoslovakia
No Drawing. Filed Nov. 6, 1963, Ser. No. 321,807
Claims priority, application Czechoslovakia, Nov. 15, 1962, 6,449/62
1 Claim. (Cl. 106—1)

This invention relates to aqueous silver suspensions, and particularly to silver suspensions which permit ceramic materials, metals, glass, mica, quartz, and ferrites to be provided by a single firing with a silver coating adequate for subsequent soft soldering or electroplating.

It is known to suspend silver compounds or powdered silver in a varnish base, to coat an object with the suspension by spraying, brushing, dipping, rolling, or screen printing, and to fire the coating at 700°–850° C.

Silver oxide and silver carbonate have been suspended in the varnish together with a flux. These compounds have also been converted to the metal by heating or by reaction with organic compounds. Silver powders have also been prepared by spraying molten silver, electrolytically, or by reducing aqueous silver nitrate solutions.

Colloidal silver solutions cannot be employed for coating purposes because microcracks are apt to form if relatively heavy layers are fired. Silver powder having a particle size of more than 10 microns permit relatively heavy coatings to be produced, but the suspensions are unstable.

The varnish component of the known coating materials consists of organic resins such as nitrocellulose, ethyl cellulose, acrylic acid derivative, polystyrene, or polyurethanes which are dissolved in flammable, sometimes explosive organic solvents. Such coating materials are difficult to use in automatic equipment because of the viscosity changes occurring in the solution by evaporation of the solvent, and the varnish component may be costly. When they are fired in an atmosphere which is not sufficiently oxidizing or at a temperature which is not quite high enough, the carbon of the resin is not completely burned and the graphite formed affects the electrical properties of the product.

The instant invention overcomes the afore-described disadvantages of known silvering compositions by the use of an aqueous suspension of silver powder prepared by the method of our simultaneously filed copending application Ser. No. 321,682, now U.S. Patent No. 3,201,-223, the suspension further containing flux and other water-soluble constituents which are volatile and do not leave a residue of graphite even when fired at relatively low temperature.

The silver suspensions of the invention may be applied by spraying rolling, brushing or in any other conventional manner. When suitably formulated, the silver suspensions of the invention are pastes which may be applied by screen printing. The silver suspensions of the invention are non-flammable and odorless. They can be prepared at a cost of approximately one third of that of the conventional silver suspensions based on organic materials.

After firing, the silver coatings of the invention are sintered, bright, and have excellent electrical properties. They may be soldered if the suspension contained a suitable flux. Silver coatings produced on structural ceramics can be metallized galvanically. Silver coatings having a thickness of 10 to 30 microns can be formed in a single firing operation. When the proper flux is used, the adhesion of the coating may exceed the mechanical strength of the ceramic substrate. Silver layers of the invention formed on steatite have an adherency of more than 100 kg./cm.$^2$ as measured by the force applied perpendicularly to the surface for tearing the coating from the substrate.

The silver suspensions of the invention are prepared as follows:

(a) Silver powder is prepared as described in our afore-mentioned patent;

(b) The necessary amounts of flux, glycerin, gum arabic or other water-soluble resin, triethanolamine, polyethylene oxide, ethylene glycol, sec.-octyl alcohol, cyclohexanol, and methylcellulose are mixed, and the mixture is homogenized in a ball mill or equivalent equipment;

(c) The previously dried silver powder is mixed with the afore-mentioned ingredients in a ball mill or the like; and (d) The mixture is suspended in enough water for proper consistency for brushing or screen printing.

The following example further illustrates the invention.

*Example*

A composition suitable for coating tubular capacitor bodies consisting of ceramics, glass, quartz, or ferrite in a single firing operation is prepared from the following components:

| | Percent |
|---|---|
| (A) Silver | 30–80 |
| (B) Flux | 0–10 |
| (C) Vehicle | 10–60 |

Component (A) is the afore-mentioned silver powder. It has a bulk density of 2.8 to 3.2 kg./liter and an oil number of 9 to 16 ml. per 100 g.

The flux (B) is an inorganic composition suitable for providing the desired mechanical and electrical properties in a known manner, and is selected according to the material to be coated. It may consist of bismuth oxide, lead borate, mixtures of these compounds, silicates, cadmium-bismuth borates and the like. The flux is omitted where optimum loss factor and permittivity are more important than maximum adhesion of the coating to the substrate.

The vehicle (C) is an aqueous solution of the following ingredients:

| | Percent |
|---|---|
| Methyl cellulose or carboxymethylcellulose | 0.1–2 |
| Polyethyleneoxide (Carbowax) | 0.1–8 |
| Gum arabic | 0.1–6 |
| Glycerin or ethyleneglycol | 0.1–5 |
| Sec.-octyl alcohol or n-octyl alcohol | 0.1–2 |
| Triethanolamine | 0.1–1.5 |
| Water to 100%. | |

A preferred vehicle contains 0.5 to 2% methylcellulose, 5% polyethyleneoxide, 0.1 to 1.5% triethanolamine, 0.1 to 5% glycerin or ethylene glycol, 0.5 to 6% gum arabic or other water-soluble resin, and 0.1 to 2% sec.-octyl alcohol or n-octyl alcohol.

An amount of the silver powder corresponding to 15–50% is placed first in the ball mill and the vehicle component is then added. The specific ratio of the several components depends on the intended mode of application. The flux, if used, is premixed with the silver powder and with water to form a pulp.

What we claim is:

An aqueous silver suspension suitable for coating a ceramic substrate and for forming a silver coating on said substrate upon firing, the suspension consisting of 30 to 70% silver particles having a bulk density of 2.8 to 3.2 kilograms per liter and an oil number of 9 to 16 milliliters per 100 grams, and of a vehicle which is an aqueous solution essentially consisting of:

| | Percent |
|---|---|
| Methylcellulose or carboxymethylcellulose | 0.1–2 |
| Polyethylene oxide | 0.1–8 |
| Gum arabic | 0.1–6 |
| Glycerin or ethyleneglycol | 0.1–5 |
| Secondary or normal octyl alcohol | 0.1–2 |
| Triethanolamine | 0.1–1.5 |
| Water | Balance. |

References Cited by the Examiner
UNITED STATES PATENTS 2,530,217  11/1950  Bain _____ 106—193 XR
2,695,275  11/1954  Gray _____ 106—193 XR ALEXANDER H. BRODMERKEL, *Primary Examiner.*

L. B. HAYES, *Assistant Examiner.*